United States Patent [19]
Anderson

[11] Patent Number: 6,110,412
[45] Date of Patent: Aug. 29, 2000

[54] TUBULAR, PORTED AIR DUCT AND METHOD FOR MANUFACTURING THE SAME

[75] Inventor: Eric D. Anderson, Akron, Ohio

[73] Assignee: Steere Enterprises, Inc., Tallmadge, Ohio

[21] Appl. No.: 09/124,177

[22] Filed: Jul. 28, 1998

[51] Int. Cl.[7] .................................................. B29C 49/20
[52] U.S. Cl. .......................... 264/504; 264/515; 264/516
[58] Field of Search .................................... 264/504, 515, 264/516

[56] References Cited

U.S. PATENT DOCUMENTS

| | | | |
|---|---|---|---|
| 4,070,429 | 1/1978 | Uhlig | 264/504 |
| 5,779,968 | 7/1998 | Richwine et al. | 264/516 |
| 5,863,489 | 1/1999 | Flood et al. | 264/504 |

FOREIGN PATENT DOCUMENTS

| | | | |
|---|---|---|---|
| 53-21030 | 6/1978 | Japan | 264/516 |
| 59-199219 | 11/1984 | Japan | 264/515 |
| 504662 | 4/1976 | U.S.S.R. | 264/504 |

*Primary Examiner*—Catherine Timm
*Attorney, Agent, or Firm*—Renner, Kenner, Greive, Bobak, Taylor & Weber

[57] ABSTRACT

A ported tubular air duct and a method for manufacturing a side-ported tubular air duct. The air duct has a side port located substantially ninety degrees (90°) to the part line of a mold in which the air duct is manufactured. The mold has two portions which are separated when the mold is opened to permit the positioning a preheated polypropylene tubular port insert member into an opening in one of the mold portions. A parison of rubber modified polypropylene is injected into the mold between the portions at approximately 410° F., and the mold is closed to seal the ends of the parison. The interior of the parison is pressurized to a level in the range of approximately 90 to 100 psi to force the parison outward against the inner sides of the mold cavity and against one end of the port member. At this juncture, the parison has a thickness in the range of 0.060 to 0.090 inches. The parison expands into the opening of the tubular port insert member and is burst by the pressure in the parison such that the parison material flows along the interior of the tubular port insert member and merges therewith. The pressurizing medium, preferably air, is allowed to flow through the port and out of the mold for approximately 10 seconds. A mandrel is then urged into the tubular port insert member so that the system again be fully pressurized. The molded air duct remains in the mold until cooled. The pressure is relieved, the mandrel is withdrawn and the part is removed from the mold.

6 Claims, 4 Drawing Sheets

TUBULAR, PORTED AIR DUCT AND METHOD FOR MANUFACTURING THE SAME

TECHNICAL FIELD

The present invention relates broadly to air ducts, and more definitively to air ducts that may be uniquely adapted for vehicular usage. More particularly, the present invention relates to an air duct having an integrally molded side port. Specifically, the present invention relates to relates to a method for manufacturing a side-ported tubular body wherein a tubular port member is inserted into a mold, and the interior surface of the tubular port member is meltingly merged with a parison of compatible material which expands into, and then controllably bursts within, the tubular port member during the forming process in the mold.

BACKGROUND OF THE INVENTION

Air induction systems for internal combustion engines typically employ a substantially tubular air duct within which to transport clean air from a filter to at least the inlet manifold, or throttle body, of the engine. Similarly, tubular air ducts are used to convey air from the engine compartment into a heating and ventilating system in the passenger compartment. One or more of these air ducts often require additional ports on the tubular body to allow air to be directed to and from other devices on the vehicle. For example, an exhaust gas recirculation system is provided in most vehicles to reduce the exhaust emissions of the engine.

In order conveniently to accommodate any passages which are to branch laterally outwardly from the air duct, a port must be attached to the air duct. Such port attachments are frequently accomplished by heat welding or adhesives. While this method of securing a laterally disposed port to the air duct may result in a satisfactory porting arrangement, it is time consuming and adds significant expense to the overall cost of the air duct. The aforesaid prior art method also requires sufficient testing after the side port is installed to ensure that no air leakage between the port and the main body of the air vent will occur during operation of the vehicle. Air leakage during vehicle operation can result in excess emissions or reduced efficiency of the engine and, therefore, reduced fuel mileage. Such leakage could also permit the entrainment of solid particles in the air stream that might well result in stalling of, or damage to, the engine.

Porting arrangements have heretofore been incorporated in blow molded articles such as fuel tanks and cylindrical containers by several known variations of the blow molding technique. With reference to U.S. Pat. No. 5,104,472 it will be observed that after the piece is removed from the mold the desired holes must be punched.

By way of another example, fuel tanks, such as that described in U.S. Pat. No. 4,877,147, may incorporate a vent tube that is positioned in the mold cavity to be secured to, or embedded within, the tank wall during the blow molding process. The securement of the vent tube to, or in, the container wall is accomplished by causing the parison to flow against, and/or around, a flanged vent tube. It should be noted that the free end of the conduit is bevelled. The resulting pointed end of the vent tube more easily pierces the parison wall. Also, the beveled end is less likely to remove a plug of material from the parison wall which might clog the vent tube.

In blow molded cylindrical containers, such as that shown in U.S. Pat. No. 3,919,374, a plug may be secured into an opening of the container during the molding process. This requires that the parison be extruded circumferentially around and past the plug. When the mold is closed, the remote, open end of the parison is pinched closed by the opposed mold halves. The plug is then captured in its own receiving cavity located along the split line of the mold so that as the mold is closed, the parison is forced into the space surrounding the plug, such that the plug is mechanically secured to the open end of the blow molded container.

SUMMARY OF THE INVENTION

It is, therefore, a primary object of the present invention to provide a novel air duct with an integral side port and a method for manufacturing the same.

It is another object of the present invention to provide a novel method for manufacturing an air duct, as above, wherein a tubular port insert member and the base material of the air duct body are sufficiently similar to be capable of a melting merger.

It is a further object of the present invention to provide a novel method for manufacturing an air duct, as above, wherein a tubular, side port insert member is integrally conjoined with the main body of the air duct by virtue of a blow molding process which effects a flow of the parison comprising the main body material, under pressure, into merging relation with the tubular, side port insert member.

It is still another object of the present invention to provide a novel method for manufacturing a side-ported air duct, as above, wherein a heated, tubular port insert member is positioned at the desired location within a mold cavity which is then injected with a parison followed by pressurization of the parison to cause a controlled bursting thereof interiorly of the tubular port insert member that results in the parison material meltingly merging with the interior wall of the tubular port insert member.

It is yet another object of the present invention to provide a novel method for manufacturing a side-ported air duct, as above, wherein a mandrel may be inserted into the tubular port insert member to preclude air flow therethrough for a predetermined period of time in order to allow the blow molding pressurization to force the parison into a melting merger with the interior of the tubular port insert member.

It is an even further object of the present invention to provide a novel method for manufacturing a side-ported air duct, as above, whereby the inserted mandrel contacts the parison material within the tubular port insert member to assist in assuring the merger of the parison material with the port insert member.

These and other objects of the invention, as well as the advantages thereof over the existing prior art relating to air ducts—and particularly air ducts intended for vehicular usage—which will be apparent in view of the following detailed specification, are accomplished by means hereinafter described and claimed.

By way of a general introductory description, the present invention provides a method for manufacturing an air duct having a generally tubular body with a side port that comprises the steps of: positioning a pre-heated, tubular port insert member into a mold; injecting a tubular parison of similar material into the mold; pressurizing the interior of the parison to cause localized, controlled bursting of the parison within the tubular port insert member whereby the parison material is merged with the tubular, port insert member; forcing a mandrel into the tubular port insert member to assist in maintaining pressurization interiorly of the parison until it cools.

To acquaint persons skilled in the arts most closely related to the present invention, a side-ported air duct, and a preferred method for making the same, that illustrate a representative and preferred means now contemplated for putting the invention into practice are described herein by, and with reference to, the annexed drawings that form a part of the specification.

DESCRIPTION OF AN EXEMPLARY EMBODIMENT

Figure 1:
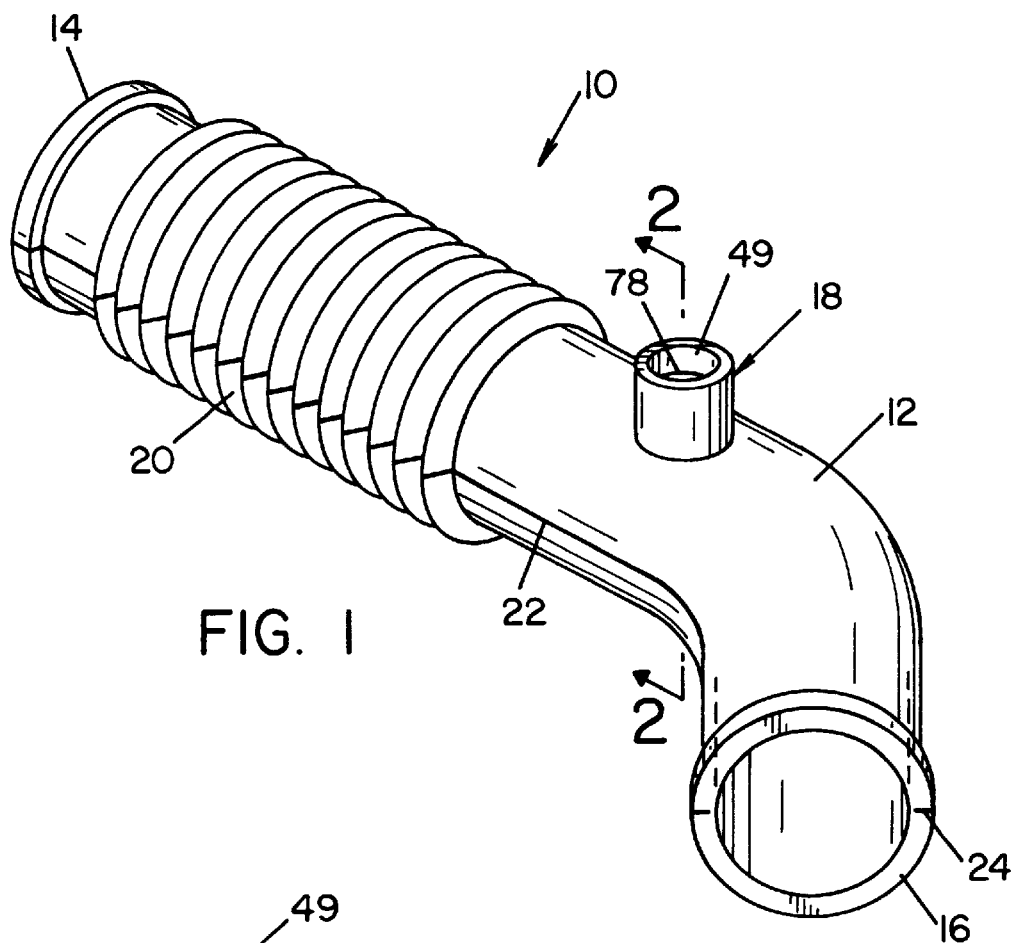
FIG. 1 is a perspective view of a blow molded tubular body with an integral side port.
Figure 2:
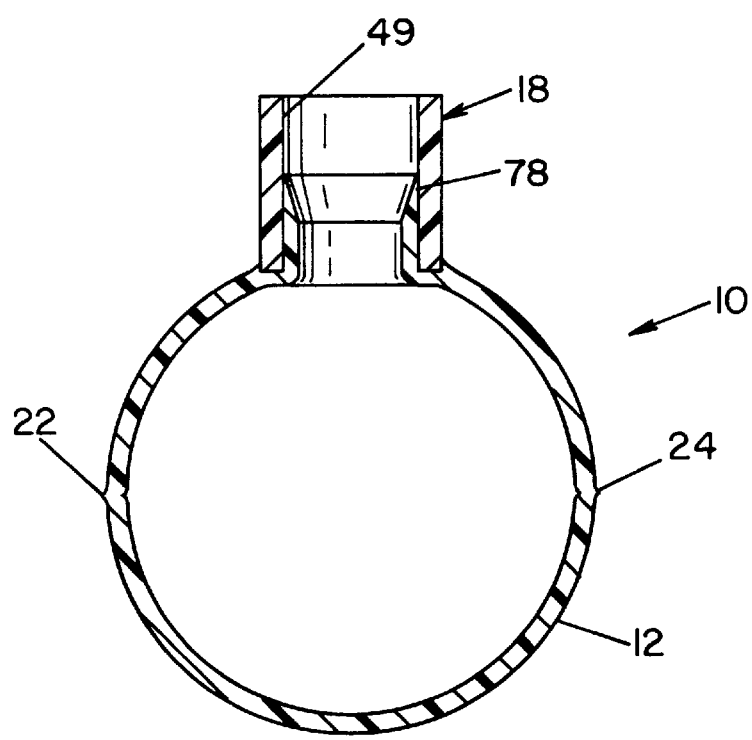
FIG. 2 is a transverse sectional view taken along line 2—2 of FIG. 1.

One representative form of a side-ported air duct, that may be made by the novel and unique method for making the same, and which embodies the concepts of the present invention is designated generally by the numeral 10 on the accompanying drawings, and that preferred form of the side-ported air duct 10 is depicted in FIGS. 1 and 2—the structural sequence of the method itself being sequentially represented by reference to FIGS. 3 through 7, inclusive.

With particular reference, then, to those figures, the tubular air duct 10 has an elongated body portion 12 with integrally formed, flanged first and second ends 14 and 16, respectively, and a laterally extending port 18. A flexible portion 20 may be formed between the port 18 and one end 14 (as shown) or 16 to facilitate installation of the air duct 10. The flanged ends 14 and 16 permit the air duct 10 to be secured in an air induction system by use of conventional hose clamps in a well known manner. The air duct 10 is a blow molded component, and as such has parting, or split, lines 22 and 24 which are substantially diametrically opposite each other and also displaced approximately ninety degrees (90°) from the port 18.

The body 12 of the air duct 10 is preferably molded from a rubber modified polypropylene material. The port 18, as will be hereinafter more fully described, is preferably also a polypropylene material that is compatible with the material from which the body 12 is formed.

Figure 3:
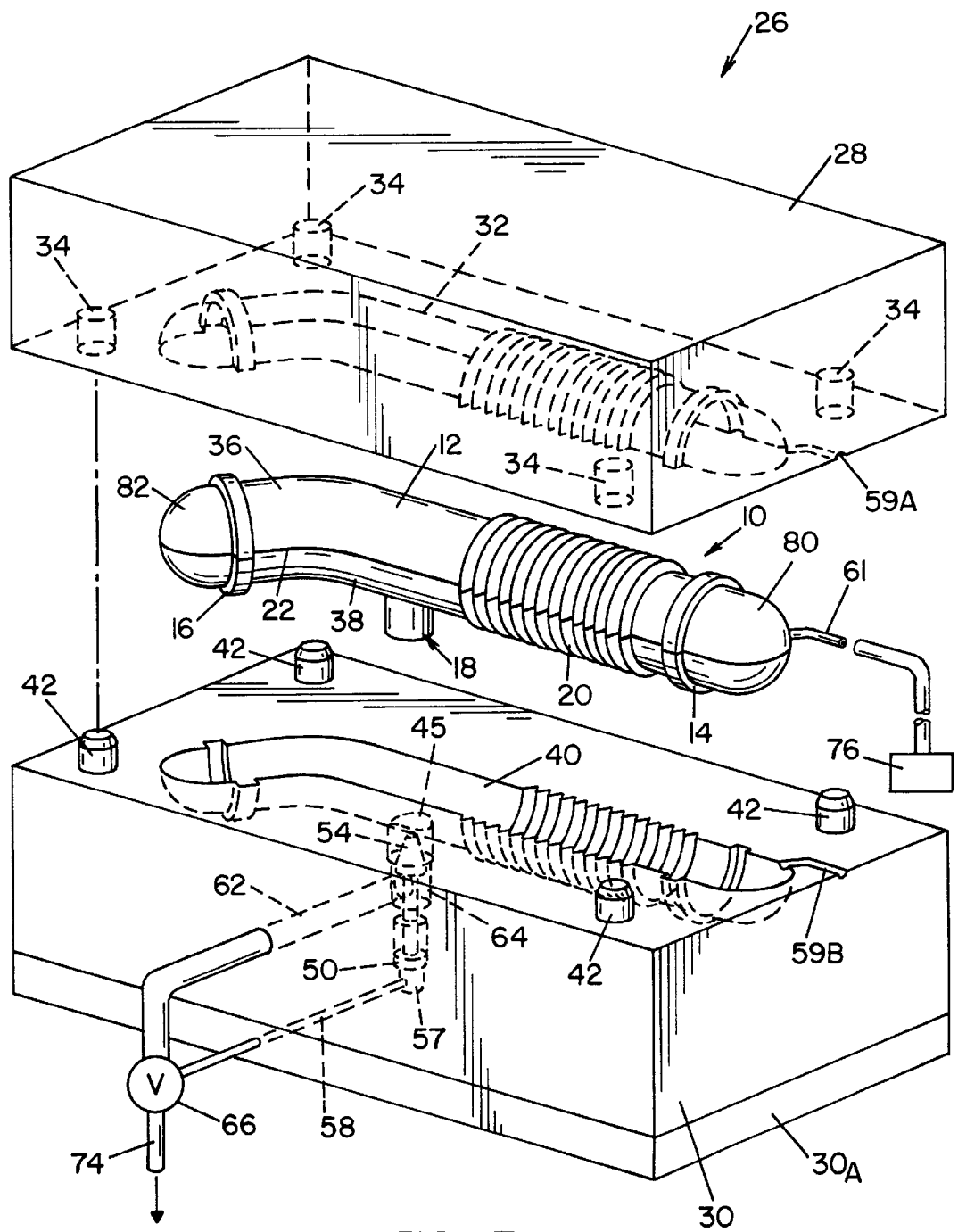
FIG. 3 is a perspective view of an open mold from which a side-ported air duct has been extracted.

The representative air duct 10 is molded in a two part mold 26 which has an upper section 28 and a lower section 30. The upper section 28 has a cavity 32, and a plurality of locator recesses 34. The cavity 32 forms the molded upper half 36 of the body 12 while the lower section 30 similarly forms the molded lower half 38 of the body 12. As depicted in FIG. 3, the upper half 36 and the lower half 38 are joined at the split lines 22 and 24.

The lower section 30 of the mold 26 has a cavity 40 and a plurality of locator pins 42 which engage in the recesses 34 in the upper section 28 when the mold 26 is closed to form a single, unified mold cavity 44 (FIG. 4) defined by the opposed upper and lower sections 28 and 30. The lower section 30 also includes a cylindrical bore 45 for supporting a tubular port insert member 46 which, when the molding process is finished, constitutes the exterior of the port 18 that extends laterally outwardly from the body 12.

Figure 6:
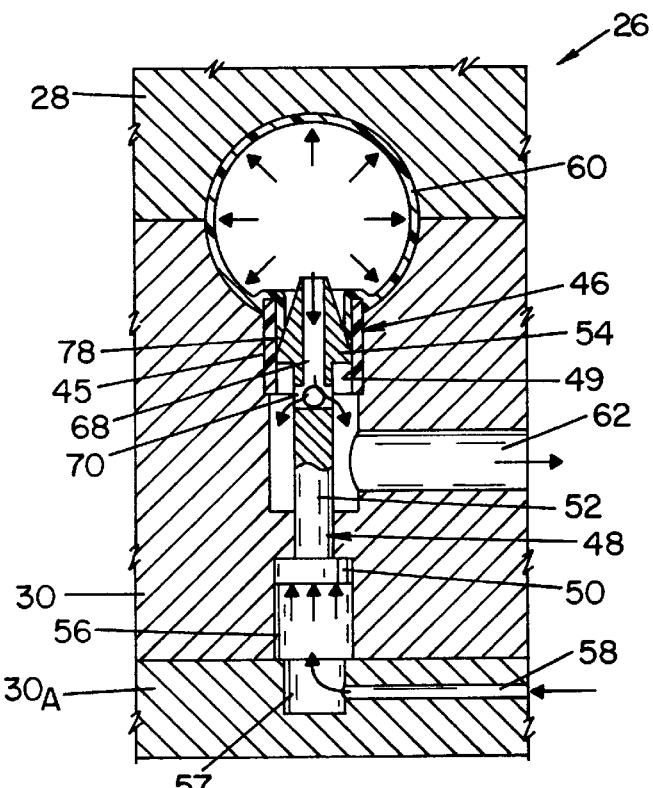
FIG. 6 is a view similar to FIG. 5 with a mandrel having been displaced to engage the inner wall of the tubular port insert member; and, FIG. 7 is a view similar to FIG. 6 with the mandrel having been withdrawn.

An actuator and mandrel mechanism 48 may also be incorporated in the lower section 30. The mechanism 48 includes a combined piston 50, stem 52 and mandrel 54. The piston 50 reciprocates in fluid-sealed engagement with the cylindrical inner wall of a bore 56 which communicates with the operating cylinder 57 that opens in opposition to the piston 50. A fluid supply passage 58 communicates with the cylinder 57 such that when pressurized fluid is directed into the operating cylinder 57, the piston 50 will force the mandrel 54 upwardly, as seen in FIG. 6. For manufacturing convenience, a base plate $30_A$ may be secured to the underside of the lower mold section 30. The operating cylinder 57 and the supply passage 58 may be incorporated in the base plate $30_A$.

A passage may be formed by opposed semi-cylindrical recesses 59A and 59B in the respective upper and lower mold sections 28 and 30 (FIG. 3). The semi-cylindrical recesses 59A and 59B are disposed transversely of the contact surfaces of the upper and lower mold sections 28 and 30, respectively, delineated by the parting lines 22 and 24. The air passage 59 that results from the juxtaposed opposition of the semi-cylindrical recesses 59A and 59B may receive a blow pin or tube, 61 which selectively introduces pressurized air into a parison 60 which may itself be introduced into the mold cavity 44 by one of several known manners. That is, the parison 60 may be preformed, or that open end of the parison remote from the end into which the air injecting blow pin 61 is received may be pinched closed by the opposed contact faces of the upper and lower mold sections 28 and 30 as the mold sections 28 and 30 are closed to form the mold 26.

An air passage 62 is also provided in the lower section 30 to direct air from a bore 64, which surrounds the stem 52 and mandrel 54, to a conventional three-way valve 66 (FIG. 3). The mandrel 54 has a central air passage 68 which communicates with the bore 64 through one or more radial passages 70 formed in the stem 52. The operating cylinder 57 communicates with an air passage 58 which is also connected to the valve 66. The valve 66 is controlled to connect the passages 58 and 62 to an exhaust passage 74, and the valve 66 also selectively interconnects the passages 58 and 62. In addition, the valve 66 provides one further operation—i.e.: it permits the passage 62 to be selectively closed and the passage 58 to be individually connected to the exhaust conduit 74.

The air injecting blow pin 61 is operatively connected with a conventional fluid source such as an air pressure source 76. This will permit the selective pressurization of the parison 60 after the mold has been closed. When the mold is closed, the ends of the parison are sealed—as previously explained—such that during molding, the body 12 has substantially hemispherical ends 80 and 82 formed integrally therewith.

Figure 4:
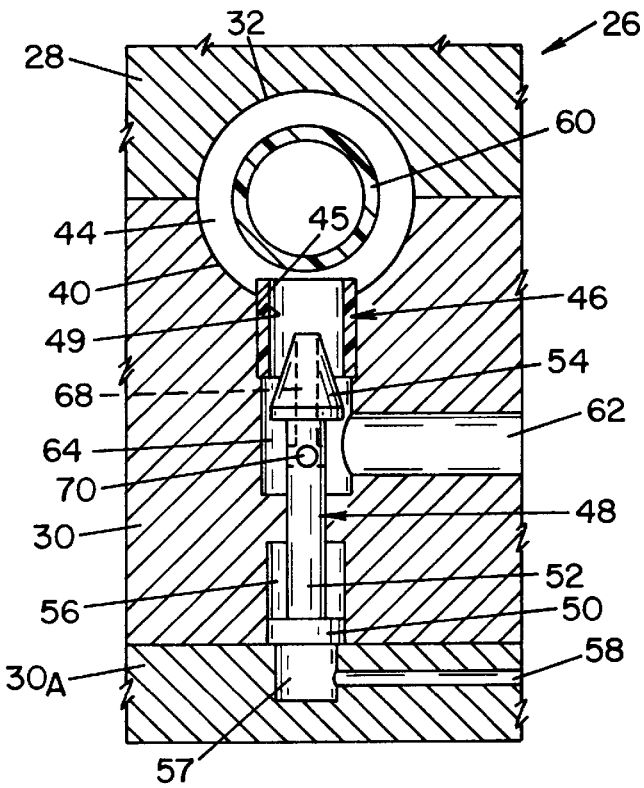
FIG. 4 is a sectional view of a portion of the mold in the closed position with the tubular port insert member in place and with the parison having been injected into the mold.
Figure 5:
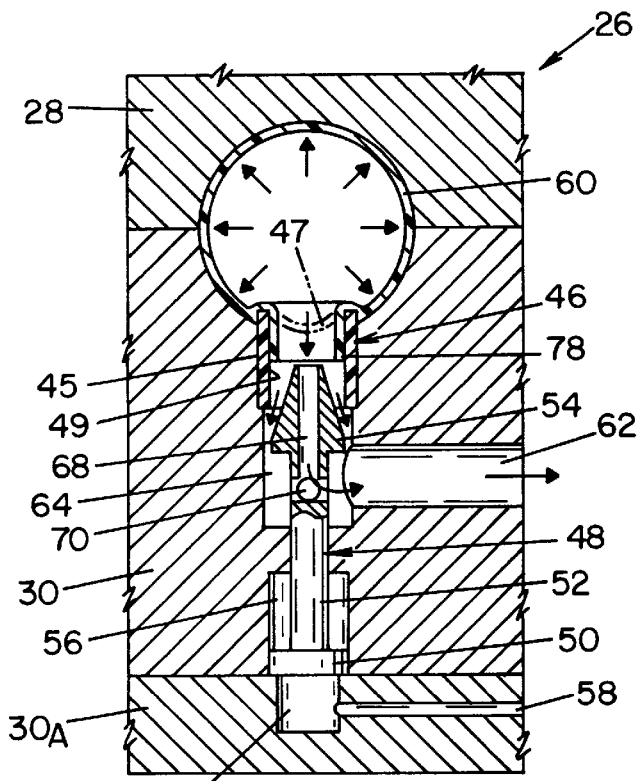
FIG. 5 is a sectional view similar to FIG. 4 with a dome, or bubble, on the parison having been expanded into the tubular port insert member (in chain line) and having been controllably burst within the tubular port insert member.

FIGS. 4 through 7 depict the molding process as it accommodates the melting merger of the body 12 interiorly of the tubular port insert member 46. As shown in FIG. 4, the port insert member 46 has been positioned in the bore 45, the tubular parison 60 has been introduced between the mold cavities 32 and 40, and the mold 26 has been closed. It should be noted that prior to positioning the port insert member 46 in the bore 45, the insert member 46 is preferably pre-heated to fall within the range of approximately 145° to 160° Fahrenheit (hereinafter simply "F.") which is below the distortion temperature—approximately 180° F.—of the polypropylene compound from which the insert member 46 is made. The parison 60 is injected at approximately 410° F. and cools slightly to 400° F. as it contacts the wall of the single mold cavity 44.

Pressurized air in the range of 90 to 100 psi is injected into the parison through the blow pin 61. This causes the parison to expand radially outward, contacting the wall of the unified mold cavity 44 as well as that end of the tubular port insert member 46 which extends into the cavity 44. The parison material expands into the tubular insert member 46 to form a dome, or bubble, 47 as depicted in phantom in FIG. 5. At his point, the representative parison 60 has a thickness of 0.060 to 0.090 inches. The representative tubular port insert member 46 has an inside diameter of 0.75 inches and a length of 0.875 inches.

The wall thickness decreases as the dome 47 is enlarged. When the dome bursts, the parison material within the tubular insert member 46 is forced against the interior wall 49 of the tubular interior passage of the insert member 46. Because the temperature of the parison material (approximately 400° F.) is greater than the distortion temperature of the material from which the tubular insert member 46 is made, a melting merger will begin along the interface of these materials. Air pressure assists in completing the melting merger of the materials resulting in the structure seen in FIGS. 5–8. As shown by the arrows in FIG. 5, after the dome 47 bursts, the air within the parison 60 will flow through the tubular port insert member 46 out through the passage 62.

As the pressurized air flows outwardly through passage 62, the valve 66 is controlled to permit the pressure to begin exhausting through conduit 74. The exhaust flow is permitted to continue for approximately 10 seconds after which the valve 66 is controlled to interconnect the passages 58 and 62 as seen in FIG. 6 to direct air pressure into the bore 56 such that the piston 50 is moved upwardly to effect engagement of the mandrel 54 with at least the lower edge 78 of the parison material that has been forced outwardly against the interior wall 49 of the tubular insert member 46 by the bursting of the dome 47. The mandrel 54 may assist in assuring a merger of the parison material with the interior wall 49 of the tubular port insert member 46 as well as in forming the lower edge 78 into a smooth transition with the interior wall 49. As the mandrel 54 applies a force to the lower edge 78 of the parison material and the air pressure within the parison 60 is re-established, the melting merger between the burst material of the parison and the interior wall 49 of the tubular port insert member 46 will be completed such that a substantially unified component emerges from the process. In fact, the transition of the parison material on the interior wall 49 to the bare interior wall 49 of the insert plug 46 can only be physically observed in the finished air duct 10 if the parison material and the tubular insert material have different coloration.

Figure 7:
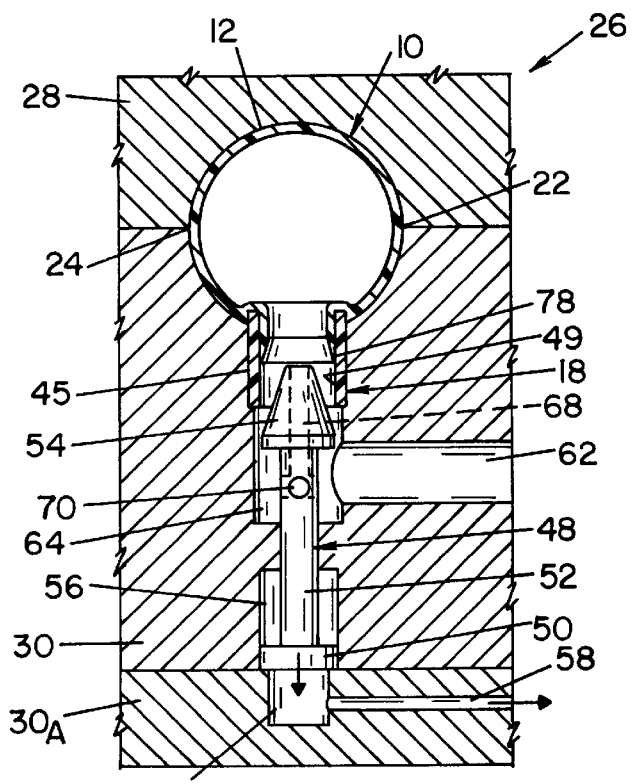

The mold cavity 44 is maintained pressurized until the blow molded component has cooled. The pressure source is then disconnected, and the valve 66 is operated to exhaust the internal pressurization through the passage 58, as seen in FIG. 7. As the pressure in passage 58 is reduced, the conjoined piston 50 and mandrel 54 slide downwardly to the rest position, also as seen in FIG. 7. The mold is then opened to permit removal of the unified, blow-molded product—depicted in FIG. 3. The ends 80 and 82 may be removed in any conventional manner—including the use of an embedded knife, as described in U.S. Pat. No. 5,529,743.

While only a preferred embodiment of the present invention is disclosed, it is to be understood that the concepts of the present invention are susceptible to variations apparent to one skilled in the art. Therefore, the scope of the present invention is not to be limited to the details shown and described but is intended to include all variations and modifications which come within the scope of the appended claims.

As should now be apparent, the present invention not only teaches that a side-ported air duct embodying the concepts of the present invention is capable of being manufactured by virtue of a novel and unique method, but also that the other objects of the invention are likewise accomplished.

I claim:

1. A method for manufacturing a side-ported duct comprising the steps of:

presenting an open mold having a first mold portion and a second mold portion with a parting line therebetween;

inserting a hollow tubular port member in one of said mold portions at a location displaced angularly from, and non-intersecting with said parting line;

introducing a parison between said first and second mold portions;

closing said mold to form a mold cavity with one end of said port member extending into said mold cavity;

pressurizing said parison with a fluid to expand said parison against said first mold portion, said second mold portion and said end of said port with sufficient pressure to cause said parison to burst interiorly of the tubular port member and thereby merge with the tubular port member;

at least partially depressurizing said pressure in said expanded parison;

forcing a mandrel into another end of said tubular port member;

re-pressurizing the interior of the expanded parison to enforce melting merger of the expanded parison and port member to form the side-ported air duct; and, allowing the side-ported air duct to cool while maintaining a pressure level in said mold cavity.

2. The method for manufacturing a side-ported air duct, as set forth in claim 1, further comprising the steps of:

preheating the tubular port member to 140° F.

3. The method for manufacturing a side-ported air duct, as set forth in claim 2, wherein:

the parison is pressurized with air in the range of 90 to 110 psi.

4. The method for manufacturing a side-ported air duct, as set forth in claim 1, comprising the further step of:

moving said mandrel within the tubular port member into engagement with the burst parison material within the tubular port member.

5. A method for manufacturing a side-ported air duct comprising the steps of:

presenting an open mold having a first mold portion and a second mold portion with a parting line therebetween;

inserting a hollow, tubular, port member in one of said mold portions at a location displaced angularly from, and non-intersecting with, said parting line;

introducing a parison between said first and second mold portions;

closing said mold to form a mold cavity with one end of the port member extending into said mold cavity;

pressurizing said parison with a fluid to to expand said parison against said first mold portion, said second mold portion and said end of said port member with sufficient pressure to cause said parison to flow along and merge with a portion of an inner tubular surface of said port member and burst interiorly of the port member;

forcing a mandrel into another end of said port member against said expanded parison on said inner tubular surface; and, allowing the expanded parison to cool while maintaining a pressure level in said mold cavity to thereby form the side-ported air duct from the expanded parison and port member merged thereto.

6. A method for manufacturing a side-ported air duct, as defined in claim 5, further comprising the steps of:

preheating the tubular port member to at least 145° F.;

allowing the fluid to flow through said parison for a predetermined time after the pressurizing step; and, re-pressurizing said parison while the mandrel is being forced into said port member.

* * * * *